P. NEUKIRCHEN.
EGG BEATER.
APPLICATION FILED MAY 25, 1917. RENEWED NOV. 17, 1919.
1,327,568. Patented Jan. 6, 1920.
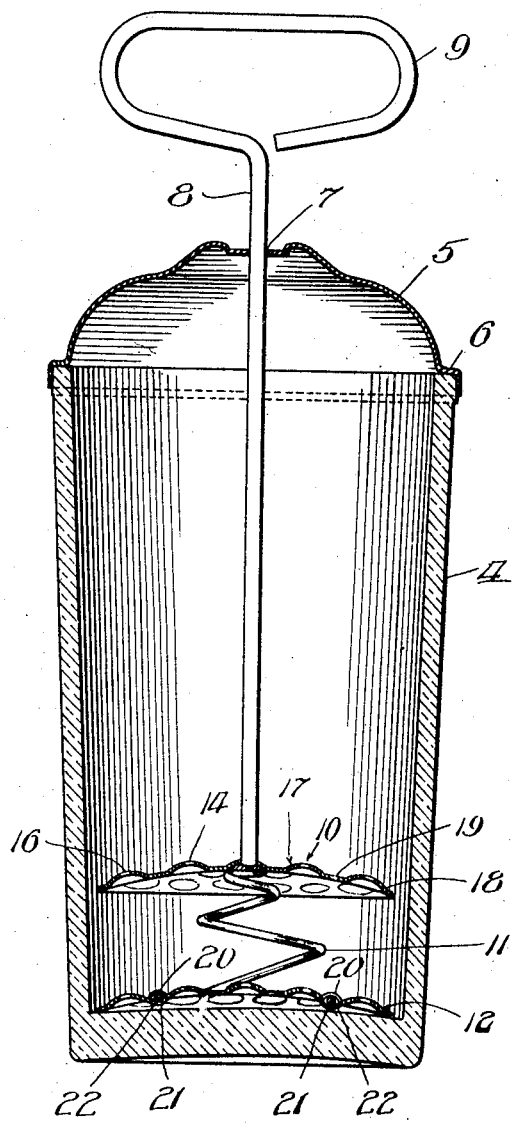
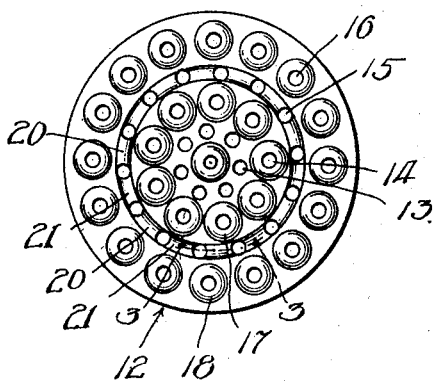
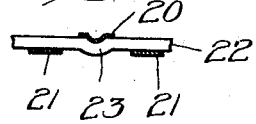
Witness:
Harry S. Gaither
Inventor:
Peter Neukirchen
by Charles O. Shurvey
Atty

UNITED STATES PATENT OFFICE.

PETER NEUKIRCHEN, OF CHICAGO, ILLINOIS, ASSIGNOR TO JULIUS H. WALD, OF CHICAGO, ILLINOIS.

EGG-BEATER.

1,327,568.  Specification of Letters Patent.  Patented Jan. 6, 1920.

Application filed May 25, 1917, Serial No. 170,802. Renewed November 17, 1919. Serial No. 338,530.

*To all whom it may concern:*

Be it known that I, PETER NEUKIRCHEN, a citizen of the United States, and a resident of Chicago, county of Cook, and State of Illinois, have invented certain new and useful Improvements in Egg-Beaters, of which the following is declared to be a full, clear, and exact description.

This invention relates to egg beaters, and its principal object is to provide an egg beater by means of which eggs, cream, salad dressings and the like may be beaten up more rapidly and satisfactorily than with the beaters now commonly in use. This object is obtained by means of an egg beater containing certain novel and improved features, which will be hereinafter fully set forth and definitely claimed.

The invention is clearly illustrated in the drawing accompanying this specification, in which:

Figure 1, is a central longitudinal section through an egg beater embodying a simple form of the present invention; Fig. 2, is a plan of a certain disk forming part of the beater; and Fig. 3, is a detail vertical section through said disk, and a certain coiled spring, the line of section being indicated at 3—3 in Fig. 2.

Referring to said drawing, the reference numeral 4, designates a container, here shown as constructed of glass and having a side wall which flares slightly toward its upper end. Upon the open, upper end of said container is a removable cover 5, which has a flanged and shouldered edge 6, which fits upon the upper end of the container. Said cover is preferably of a dome-like formation, and is provided with a central opening 7, through which extends the stem 8, of the beater. The upper end of said stem is formed with a handle 9, and the lower end is soldered or otherwise secured to a disk 10. Below the disk is a coiled spring 11, of conical formation, the upper end of which is soldered or otherwise secured to the lower side of the disk 10, near its center. A companion disk 12, is secured to the lower end of the spring 11, as will be hereinafter described.

The disk 10, is provided with a plurality of annular rows of perforations 13, 14, 15 and 16, suitably spaced apart, and the metal of the disk around the perforations 14 and 16 is preferably struck up to provide concavo-convex or cup-like portions 17, 18, thereby leaving depressed-like portions 19, between the cup-like portions 17, 18. The disks 10, 12, may be similar in these respects, but in addition to the perforations and cup-like portions, the metal of the disk 12 is struck up as at 20, along the annular row of perforations 15, and struck down as at 21, and the lower turn 22, of the coiled spring is inserted over and under the bends, as is clearly indicated in Figs. 1, and 3. To guard against accidental disconnection between the spring and disk 12, one of the bends 20, may be dented as at 23, the lower turn of the coiled spring being correspondingly dented. Evidently this distortion of the parts effectually prevents the withdrawal of the disk 12, from the coiled spring 11.

In operation, the egg or eggs, or other materials to be acted upon, are placed in the container 4, the beater inserted into the container, and the cover placed upon the upper edge thereof. The cover is held in place, and the beater is reciprocated rapidly in the material in the usual and customary manner, the lower disk being brought into contact with the bottom of the container each time with sufficient force to compress the spring 11, and forcing the disk 10, down toward the lower disk 12. The concavo-convex portions around the apertures 14, 16, act in the manner of suction cups when the beater is being lifted, and the depressed portions 19 also act in the manner of suction cups, the result being that the mass is broken up and aerated more rapidly and effectively than with the ordinary egg beaters, and with less labor.

It has been found that an egg beater embodying the hereinabove described disk may be used successfully with or without the disk 12, and it may be used successfully without the coiled spring and lower disk.

While I have described this device as an egg beater, it may be employed for whipping cream, salad dressings, and the like.

I claim as new and desire to secure by Letters Patent:

1. In a device of the character described, a beater member having a stem, a perforated beater disk secured thereto, a coiled spring below said disk, and secured thereto, and a second beater disk below said spring and secured thereto.

2. In an egg beater, a beater stem, a perforated beater disk of uniform thickness throughout secured to said stem, a second beater disk of uniform thickness throughout, located below said first mentioned disk, and a coiled spring secured to and connecting said disks.

3. In an egg beater, a stem and a perforated beater disk, secured thereto, said disk being formed with concavo-convex portions surrounding certain of the perforations.

4. In an egg beater, a stem, a disk secured thereto, and having a plurality of annular rows of perforations formed therein, the metal of said disk around the portions of the alternate rows being struck up to form concavo-convex portions.

5. In an egg beater, a perforated beater disk, having the alternate portions of its metal between certain of the perforations struck up, and the intermediate portions struck up in a direction opposite thereto, and a coiled spring having one end thereof inserted between said struck up portions.

6. In an egg beater, a perforated beater disk, having the alternate portions of its metal between certain of the perforations struck up, and the intermediate portions struck up in a direction opposite thereto, and a coiled spring having one end thereof inserted between said struck up portions, one of said struck up portions having a dent formed therein, and the wire at said dented portion being correspondingly dented.

PETER NEUKIRCHEN.